March 22, 1927.
H. E. HODGSON
ANTISKID DEVICE
Filed April 18, 1924
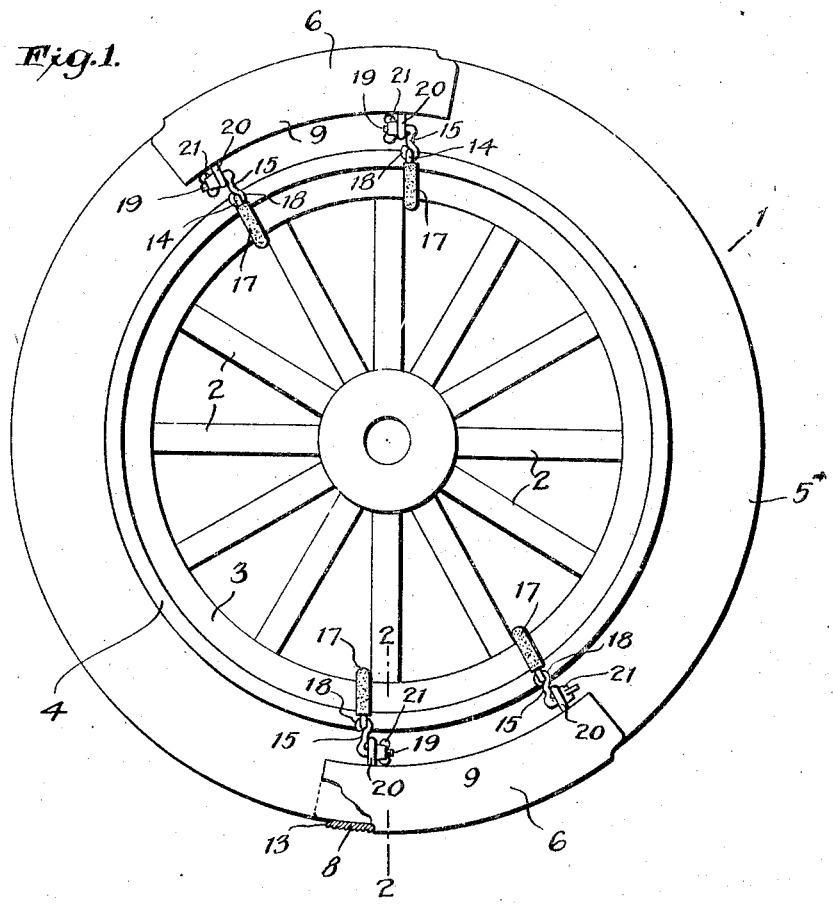
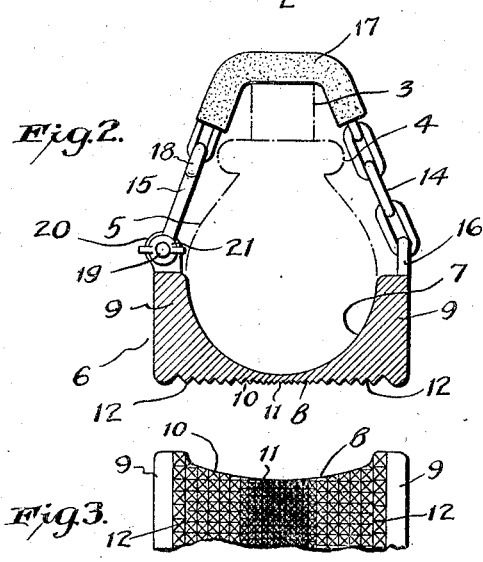
INVENTOR
Harriette E. Hodgson
BY
ATTORNEY Patented Mar. 22, 1927.

1,621,883

UNITED STATES PATENT OFFICE.

HARRIETTE E. HODGSON, OF NEW YORK, N. Y.

ANTISKID DEVICE.

Application filed April 18, 1924. Serial No. 707,338.

The invention relates to anti-skid devices for automobiles, and the object is to provide a device which shall not only be simple and effective, but very easy to apply.

In the accompanying drawings forming part hereof:

Fig. 1 is a side elevation of an automobile wheel and tire, with two of the devices applied thereto, a portion of one of the anti-skid blocks being broken away and sectioned;

Fig. 2 is a cross-section on the line 2—2 of Fig. 1, the outline of the cross-section of the wheel and tire being shown by broken lines; and Fig. 3 is a bottom plan view showing an end portion of one of the blocks.

The automobile wheel shown in Fig. 1 is designated as a whole by the numeral 1. The spokes are marked 2, the felly 3, the rim 4, and the pneumatic tire 5.

The device comprises a segmental block 6, the back or inner side of which is formed with a channel 7 shaped to seat on and embrace the outer half of the tire, more or less.

The block comprises a tread portion 8, thin at the center, and heavy side-wing portions 9. The tread portion is laterally extended substantial distances by the side portions, so as to produce a wide tread surface 10, which is roughened by crossing grooves forming multitudinous pyramidal serrations. These serrations, it will be noted, are shallow in the central longitudinal zone 11 and are deeper in the lateral zones 12.

The relatively massive side portions 9 are extended at the ends beyond the tread portion 8, as by incurving the ends of the tread portion, as seen in Fig. 3, so that the ends of the side portions take the pressure against the roadway off the ends of the tread portion, thereby preventing the latter from cutting into the tire. As a further precaution, the end lip of the tread portion rounds off from the tire channel, in the vertical plane, as illustrated at 13 in Fig. 1.

The block is held in place on the wheel with the aid of flexible members, as chains 14, which are adapted to pass from one side portion, under the felly to the other side, where they can be fastened and unfastened by fastenings 15. The most advantageous fastening for the purpose is a form of the screw-threaded, nut-engaging hasp hook disclosed in my Patent No. 1,468,861, dated September 25, 1923.

The block has two chains permanently connected at one end of each to eyes 16 on one of the side-portions 9, near opposite ends thereof. The chains, or the portions thereof which bear against the felly and the spokes, are provided with compressible sheaths 17 of leather or the like, which not only prevent marring of the wheel but also afford sufficient compressibility to insure a close fit around the felly and tire when the fastenings are engaged.

Each of the hooks 15 has an eye 18 at its rear end pivotally engaging the end link of its chain, and a hook end 19, which is screw-threaded. These ends are adapted to be passed through transverse eyes 20 on the other side portion 9. When the hook ends are thus inserted through these eyes, easily operated wing-nuts 21 are screwed onto the protruding ends, against the eyes, thereby firmly securing the anti-skid device in place.

The block is of such length as to include a pair of spokes, and the chains 14 cooperate with these spokes to keep the block from moving around the wheel.

It will be seen that the device can be applied and removed with little effort. Two of the devices will usually be sufficient for a wheel, in which event they may be applied substantially opposite each other.

What I claim as new is:

An individual anti-skid device comprising an elongated segmental block formed with a channel in its back to seat on the pneumatic tire of an automobile wheel and provided with fastening means to pass about the felly, said block comprising a thin central tread portion adapted to present an inconsiderable intervening thickness between the tire and the ground, and heavy side wing portions the tread surfaces of which are in lateral continuation with the under surface of the thin central tread portion, said tread surfaces being provided with serrations which extend both laterally and longitudinally and which are deeper under said wings than in the central portion.

HARRIETTE E. HODGSON.